United States Patent [19]

Dreyfous

[11] Patent Number: 5,433,611
[45] Date of Patent: Jul. 18, 1995

[54] TEACHING APPARATUS AND METHOD FOR VISUALLY REPRESENTING POLYNOMIAL EXPRESSIONS

[76] Inventor: Ricardo Dreyfous, Condominio Montebello, Apt. J119, Trujillo Alto, Puerto Rico, 00976

[21] Appl. No.: 115,568

[22] Filed: Sep. 3, 1993

[51] Int. Cl.$^6$ ............................................. G09B 23/02
[52] U.S. Cl. ..................................... 434/211; 434/188
[58] Field of Search ............... 434/192, 211, 216, 201, 434/200, 202, 209, 191, 188, 189

[56] References Cited

U.S. PATENT DOCUMENTS

| 209,385 | 10/1878 | Davis | 434/211 |
|---|---|---|---|
| 347,696 | 8/1986 | Shane | 434/192 |
| 811,625 | 2/1906 | Edmonds | 434/211 X |
| 2,932,908 | 4/1960 | Gough | 434/191 X |
| 3,858,332 | 1/1975 | Rasmussen . | |
| 4,332,567 | 6/1982 | Nogues . | |
| 4,445,865 | 5/1984 | Sellon | 434/209 X |
| 4,645,461 | 2/1987 | Mortensen . | |
| 4,979,749 | 12/1990 | Onanian . | |

FOREIGN PATENT DOCUMENTS

| 1031507 | 6/1953 | France . | |
|---|---|---|---|
| 1405967 | 12/1965 | France | 434/188 |
| 20209 | 1/1915 | United Kingdom . | |
| 1569749 | 6/1980 | United Kingdom . | |

Primary Examiner—Gene Mancene
Assistant Examiner—Jeffrey A. Smith
Attorney, Agent, or Firm—Oliff & Berridge

[57] ABSTRACT

An apparatus for teaching polynomial expressions includes an arrangement of groups of rows and columns that represent the variables of factors of a polynomial expression. Each group of columns or rows has a different width or height, respectively, and represents a different variable in the polynomial expression. The apparatus enables an algebra student to visualize the rules that apply to polynomial expressions. In one embodiment, the rows and columns are defined by a plurality of pegs or nails fixed to a supporting member. Each factor of the polynomial expression is represented by isolating the variables of the factors by extending an elastic member around the appropriate pegs. The intersection of the two isolated factors represents the product of the factors.

21 Claims, 5 Drawing Sheets

TEACHING APPARATUS AND METHOD FOR VISUALLY REPRESENTING POLYNOMIAL EXPRESSIONS

BACKGROUND OF THE INVENTION

The present invention is directed to a teaching apparatus and its method of use for demonstrating polynomial expressions, and more particularly, to a teaching apparatus and method that visually represents each factor of a polynomial expression and visually represents a simplification of the expression.

A current trend in teaching mathematics is the physical representation of rules and theorems so that students can visualize how the math works without baseless memorization and application of the rules and theorems. There has been previously disclosed various apparatuses for teaching mathematics so that the students can construct the rules themselves through visual derivation using a teaching apparatus.

U.K. Patent No. 20,209 describes a demonstrating apparatus for teaching numbers. The disclosure recognizes that it is desirable for the students to carry out a process demonstrated on a main frame by the teacher. The disclosed apparatus is similar to an abacus.

French Patent No. 1,031,507 describes the use of a plurality of cubes and blocks to teach polynomial expressions.

U.S. Pat. No. 3,858,332 to Rasmussen describes a method and apparatus for demonstrating polynomial algebraic operations. The assembly demonstrates algebraic operations by the manipulation of a plurality of rectangular elements of different sizes and shapes.

U.K. Patent 1,569,749 describes a similar block configuration arrangement for teaching polynomial expressions.

U.S. Pat. No. 4,979,749 to Onanian describes a multi-use number board having a series of substantially square raised surfaces or lands arranged in rows and columns on the top surface of the board and separated by an array of substantially perpendicular channels. The board includes holes at the intersections of the channels for receiving a plurality of pegs. In this respect, a string or elastic band may be stretched about the pegs for the formation of various shapes or figures or for use as a geoboard.

U.S. Pat. No. 4,645,461 to Mortensen describes a method for structurally differentiating polynomial functions using parallelogramic elements. The methods include representing a first ordered pair defined by the polynomial function as a construction of such structural elements.

U.S. Pat. No. 4,332,567 to Nogues describes a mathematical teaching apparatus formed by a cubic block array comprising a plurality of different size blocks arranged in rows and columns. The cubic block array has a base array of 10×10 blocks commencing with a 1 cm block and progressing in X and Y rows with increasing length blocks and overlying arrays of the same pattern but progressively increasing in height. The blocks are used to demonstrate multiplication, addition and subtraction as well as cubing and elementary algebra.

Problems arise in the above apparatuses in that often they are expensive to manufacture, include too many small parts, are difficult to comprehend, and are not effective as a teaching tool, etc. Accordingly, there is a need for a simple and effective teaching apparatus for representing polynomial expressions that helps to develop the necessary skills for learning algebra.

SUMMARY OF THE INVENTION

It is therefore an object of the present invention to provide a teaching apparatus and method for representing polynomial expressions that overcomes the problems of the existing devices.

It is another object of the invention to provide a teaching apparatus that is simple and inexpensive to manufacture while effectively assisting students in visualizing the rules and theorems for solving and working with polynomial expressions.

It is yet another object of the invention to provide a method of using a teaching apparatus for representing polynomial expressions that is effective and easy to understand by beginning, intermediate, and college level algebra students.

These and other objects and advantages are accomplished by providing an apparatus for teaching polynomial expressions including a representation of a first column having a first width that represents a first variable of a first factor of a polynomial expression and a representation of a second column having a second width different from the first width. The second width represents a second variable of the first factor. The apparatus further includes a representation of a first row having a first height representing a third variable of a second factor of the polynomial expression and a representation of a second row having a second height different from the first height. The second height represents a fourth variable of the second factor. The sum of the first variable and the second variable constitutes the first factor, and the sum of the third variable and the fourth variable constitutes the second factor. In one aspect of the invention, the first width is equal to the first height and the second width is equal to the second height. Moreover, the first variable and the third variable preferably represent "Y" in the polynomial expression, and the second variable and the fourth variable preferably represent "X" in the polynomial expression.

In another aspect of the invention, the apparatus includes a representation of a third column having a third width different from the first width and the second width, the third width representing a fifth variable of the first factor, and a representation of a third row having a third height. The third height represents a sixth variable of the second factor where the third width is equal to the third height.

In yet another aspect of the invention, the representation of the columns and the rows includes at least two pegs fixed to a supporting member or a plurality of pegs fixed to the supporting member arranged in rows and columns along the supporting member or around the perimeter of the supporting member.

In still another aspect of the invention the representation is in the form of a visual display. The visual display may be generated by a computer or printed on a substrate. Furthermore, a plurality of transparent flexible strips can be placed on the substrate to define the factors of the polynomial expression.

In still another aspect of the invention, the apparatus includes a representation of a plurality of columns that include at least one each of at least a first column having a first width and a second column having a second width different from the first width. The first width represents a first variable of a first factor of a polynomial expression and the second width represents a second variable of the first factor. The apparatus also includes a representation of a plurality of rows that include at least one each of at least a first row having a first height and a second row having a second height different from the first height. The first height represents a third variable of a second factor of the polynomial expression and the second height represents a fourth variable of the second factor. The sum of the first variable and the second variable constitutes the first factor, and the sum of the third variable and the fourth variable constitutes the second factor.

In another aspect of the invention, a method is described for teaching polynomial expressions using the above-described apparatus.

BRIEF DESCRIPTIONS OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

The invention and the teaching concept will now be described in conjunction with a preferred embodiment, however, those of ordinary skill in the art will contemplate alternatives and equivalents that fall within the scope of the invention, and the description is not meant to be limiting.

Figure 1:
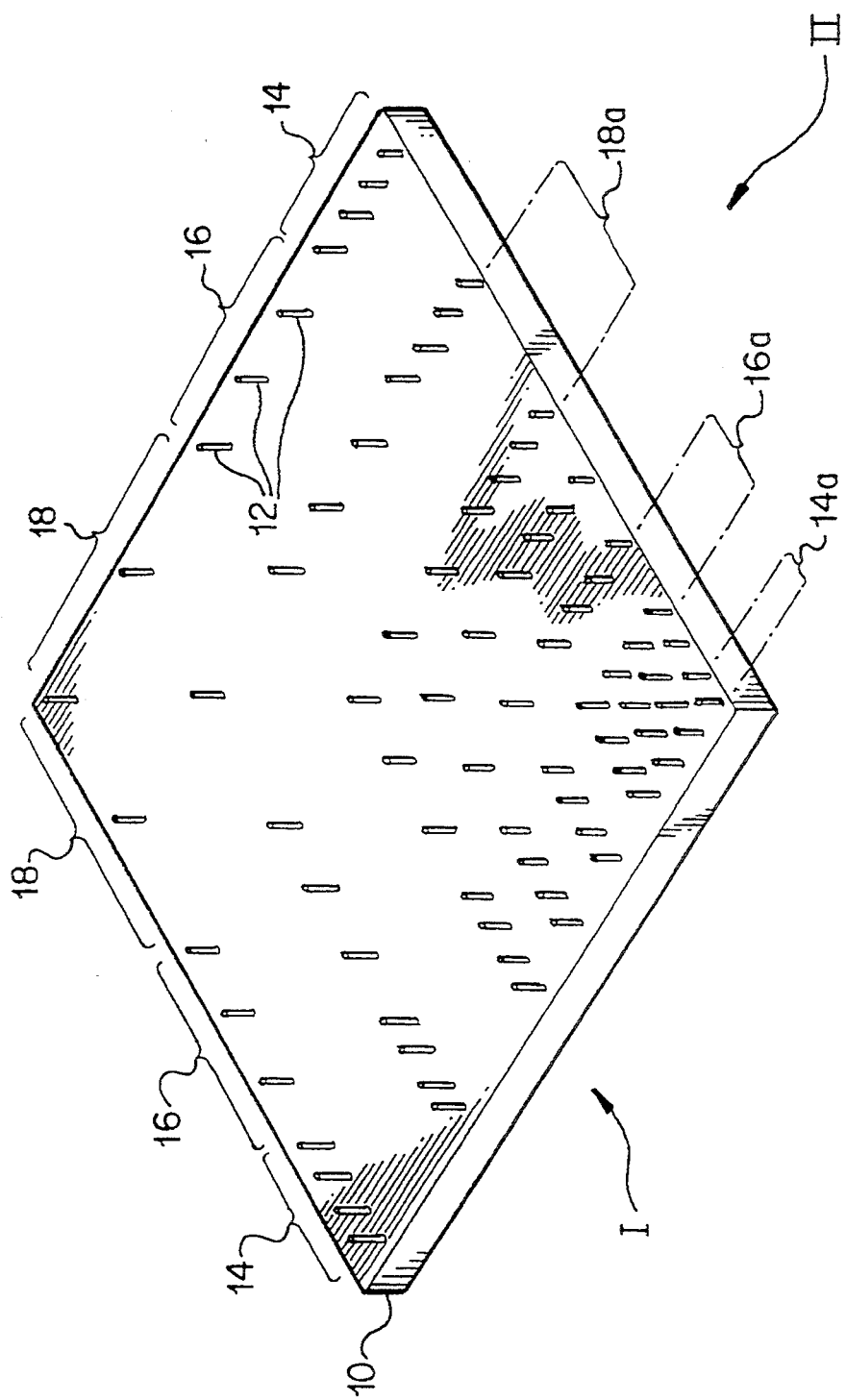
FIG. 1 is a perspective view of a first embodiment of the present invention.

Referring to FIG. 1, a supporting member 10 has fixed to a top surface a plurality of pegs or nails 12. Supporting member 10 is preferably made of wood or any material capable of supporting pegs 12. Pegs 12 are arranged on supporting member 10 to define a plurality of groups of rows and columns. Each group of rows and columns has a different height or width, respectively than the other groups of rows or columns.

In FIG. 1, three groups of rows and columns are depicted. Pegs 12 of a first group 14 are separated by a distance 14a; pegs 12 of a second group 16 are separated by a distance 16a; and pegs 12 of a third group 18 are separated by a distance 18a. Each different width group represents a different variable in a polynomial expression. Moreover, the factors of the polynomial expression to be multiplied, divided, factored, etc., are each represented by either rows or columns, respectively. For example, a first factor is represented along rows (columns) I, and a second factor is represented along columns (rows) II.

Each row or column group 14,16,18 is representative of variables in the polynomial expression. For instance, group 18 (and therefore, width 18a) represents "Y" or the like; group 16 (width 16a) represents "X" or the like; and group 14 (width 14a) represents "N" or the like (i.e., 1, 2, 3, . . . N).

By representing the factors of the polynomial expression along these rows and columns 14, 16, 18, students can visualize the structure of a polynomial expression, thereby enabling them to formulate their own rules. The present invention is not an apparatus for solving polynomial expressions, but rather, is an apparatus for assisting the learning of polynomial expressions.

Figure 2:
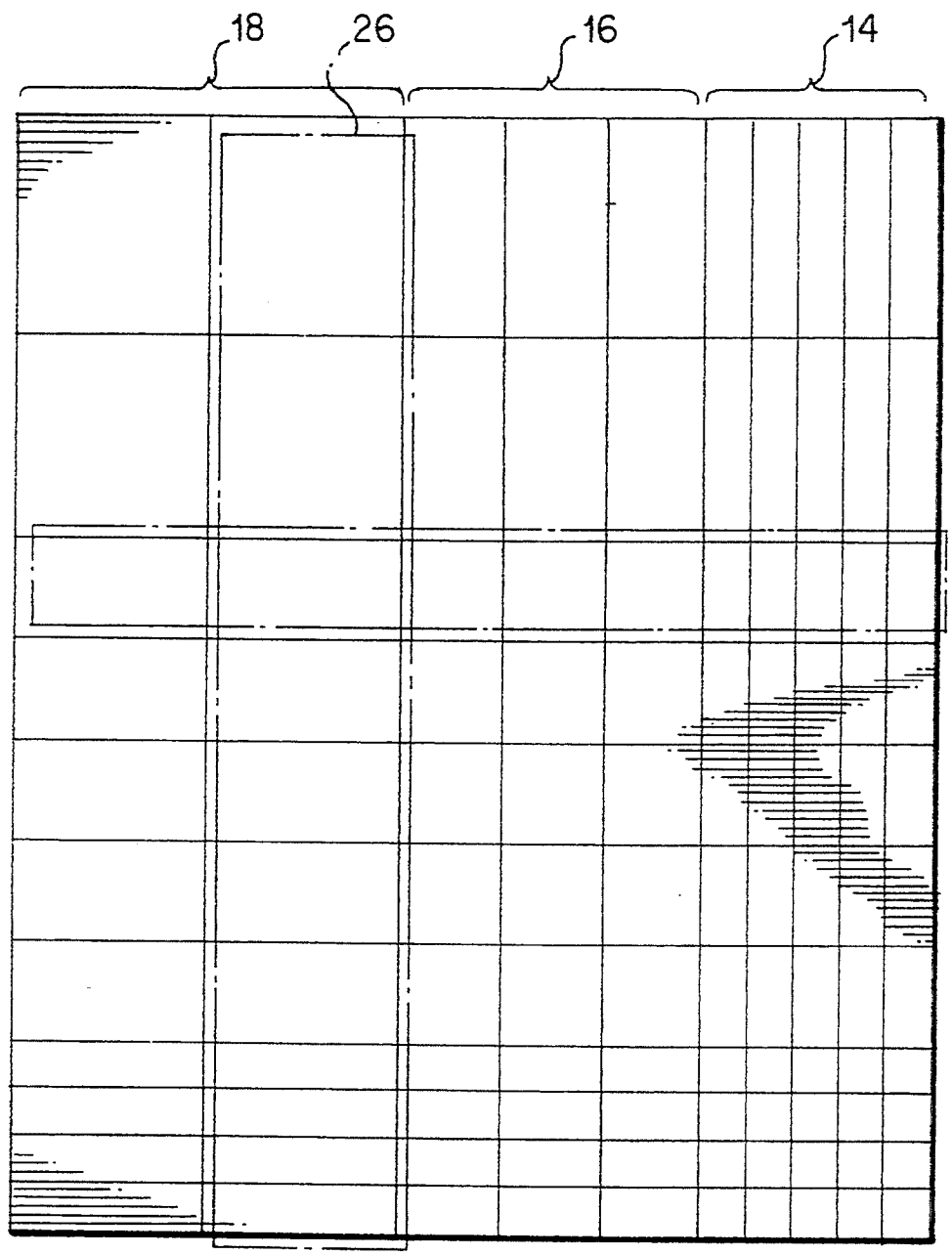
FIG. 2 is a visual display of the rows and columns in the apparatus of the invention.

FIG. 2 shows the rows and columns representing the variables of the polynomial expression as they would appear if the pegs in FIG. 1 were connected by lines. Alternatively, FIG. 2 represents the grid as it would appear on a substrate, such as paper. A teacher could display the grid on an overhead projector or the like while the students worked on individual grids.

Figure 3:
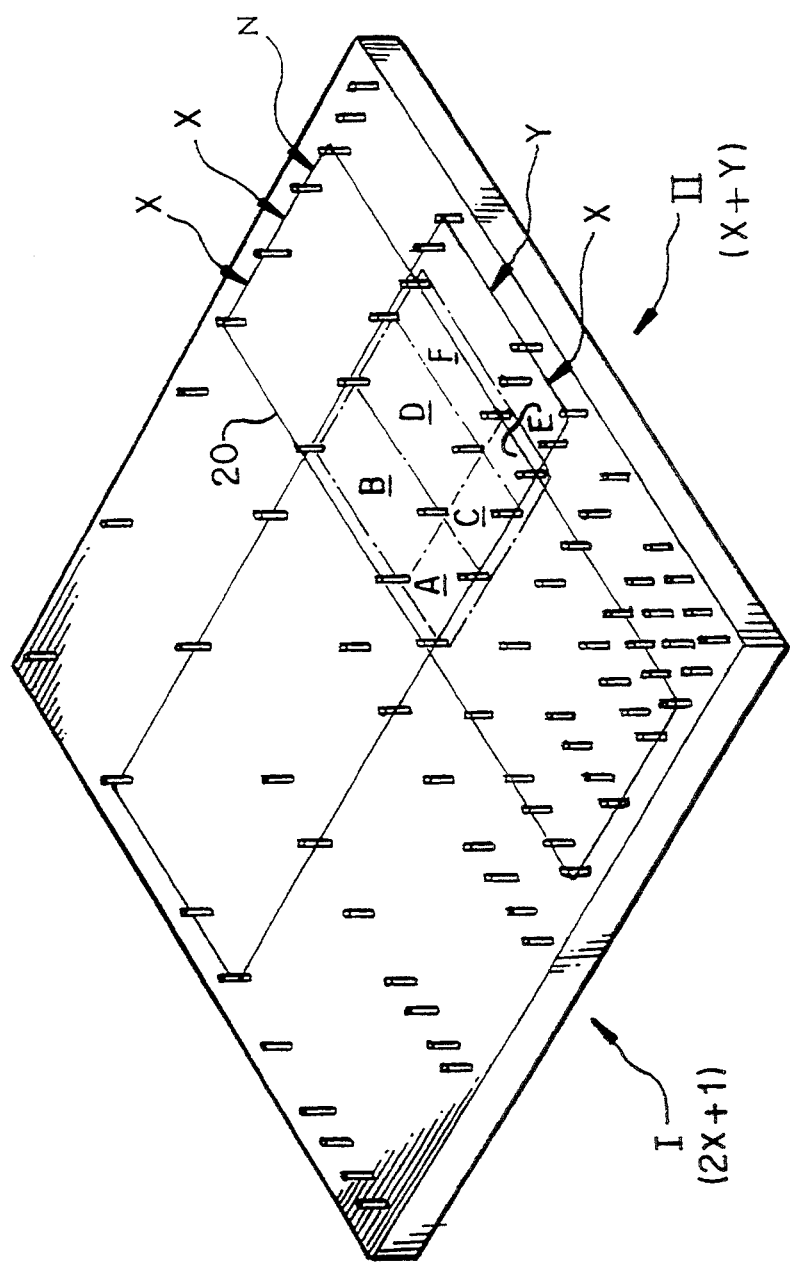
FIG. 3 is a perspective illustration showing the method of the invention.

The teaching concept of the arrangement will now be described in conjunction with FIG. 3. Using the base expression $(2X+1)(X+Y) = 2X^2 + X + 2XY + Y$, a first factor $(2X+1)$ is represented along rows (columns) I, and a second factor $(X+Y)$ is represented along columns (rows) II. In a preferred embodiment, an elastic member 20 such as a rubber band is used to isolate the desired variables of the factor. The sum of the columns (rows) isolated in each group constitutes the variable of the factor. For example, to represent "2X," two "X" columns (rows) are isolated. Accordingly, to isolate $(2X+1)$, the elastic member 20 is placed around two "X" rows and one "N" row, where N=1. Similarly, to isolate $(X+Y)$, an elastic member is placed around one "X" column and one "Y" column. If the desired rows (columns) are not adjacent one another (e.g., $(X+Y+1)$), additional elastic members 20 will be necessary.

The product of the isolated factors on the grid is represented by the area of the cross section of the rows and columns isolated by elastic members 20. In the expression illustrated in FIG. 3, the resulting area and representation of the product of the factors is determined by adding the areas of boxes $A+B+C+D+E+F$. The area of box A is $X^2$ as the width of each side of the square is the "X" width 16a. The area of box C is similarly $X^2$. Therefore, the first variable in the polynomial expression is $X^2+X^2$, or $2X^2$. The area of boxes B and D is $XY+XY$ or $2XY$ as each box contains one side having the "Y" width 18a and one side having the "X" width 16a. In a corresponding manner, the area of box E equals X, and the area of box F equals Y. The sum of boxes A-F represents the product of the factors, which equals $2X^2+X+2XY+Y$.

The concept is not limited to positive variables in the polynomial representation. Negative variables can be accommodated, for example, by using a different colored elastic member such as red. For example, to represent $(X-)$, a first elastic member 20 is placed around one "X" row, and a second elastic member 20 of a different color such as red is placed around one "Y" row. In visualizing the polynomial expression, the red areas in the intersection of the isolated factors are considered negative.

In a similar fashion as the representation of the product of factors in a polynomial expression, the apparatus can be used for division and factorization. This process is a somewhat reverse iterative of the above-described process. Namely, the students isolate the desired intersection representing the polynomial expression using the divisor for division or through an iterative trial and error process for factorization. This reverse iterative process is very helpful in teaching students the rules for the construction of polynomial expressions.

The apparatus enables a student to visualize the polynomial expression thereby facilitating the learning of rules relating to polynomial expressions. The apparatus can be expanded to include any number of columns in each group as well as any number of other groups.

Figure 4:
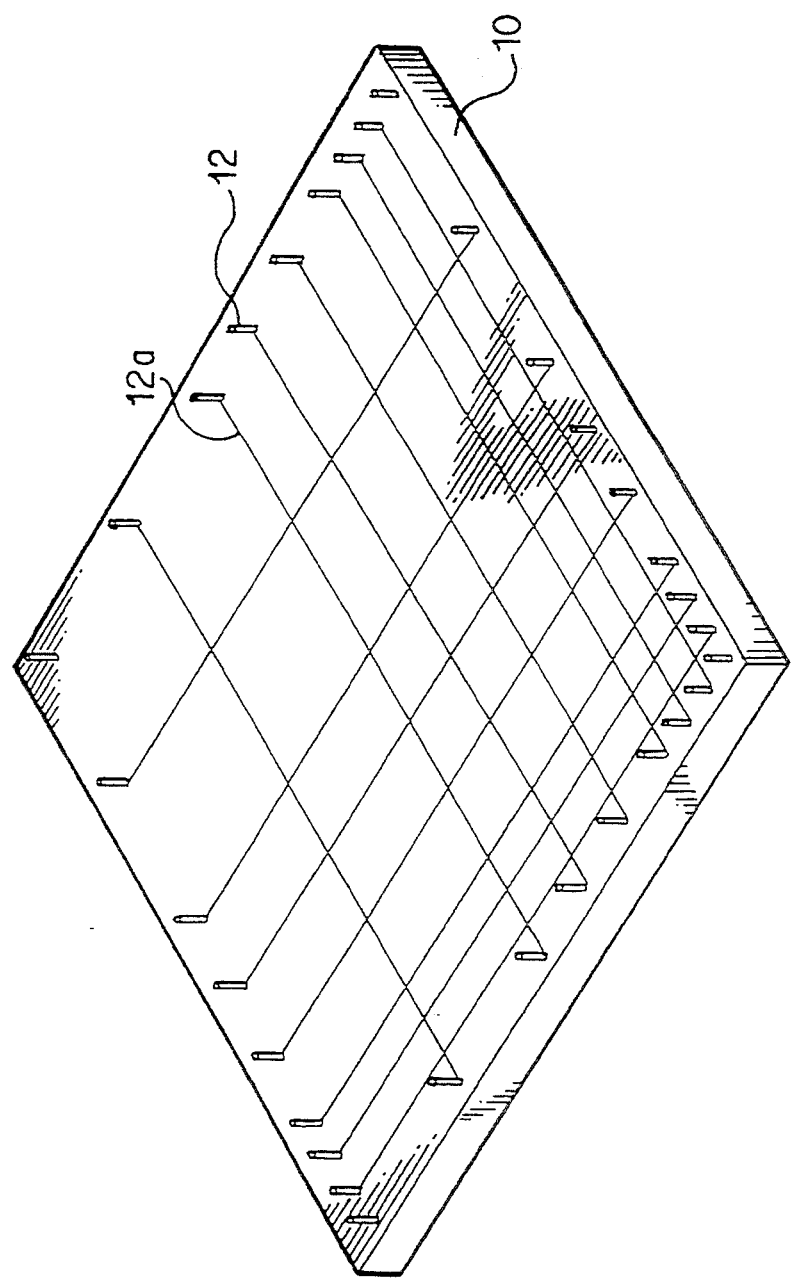
FIG. 4 shows a perspective view of another embodiment of the invention.

In an alternative arrangement, referring to FIG. 4, pegs 12 are fixed only to the perimeter of the supporting member 10. A plurality of lines 12a connect pegs 12 thereby defining the grid.

Figure 5:
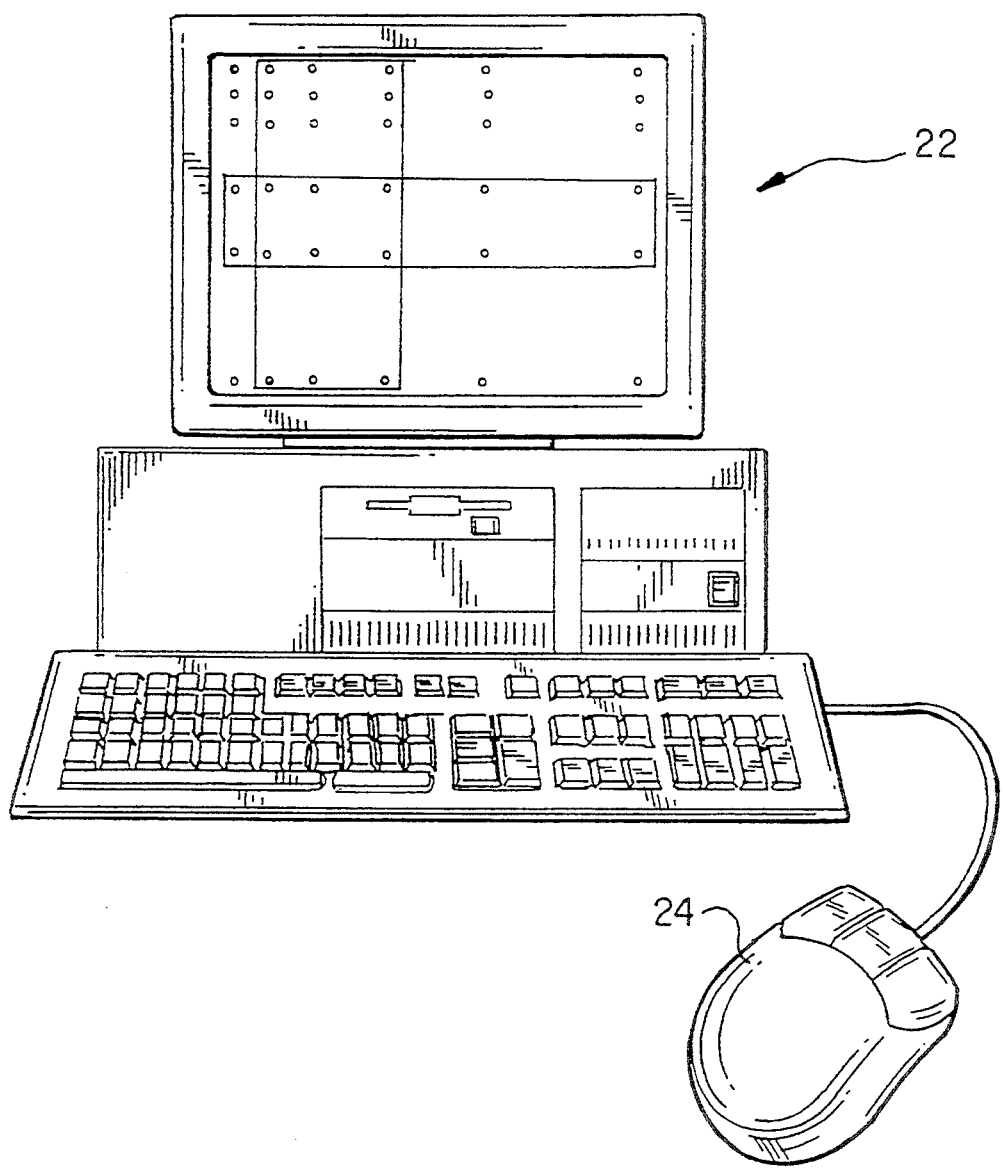
FIG. 5 shows an embodiment of the invention where the visual representation is generated by a computer.

FIG. 5 illustrates an alternative embodiment of the invention. In this embodiment, the grid can be in the form of a visual display generated by a computer 22 or a separate electronic device or the like. A known graphics driver can enable an interactive dialog between an operator and the computer via a mouse 24, or in the case of the electronic device, a keypad on the device itself. The computer can incorporate additional graphics and colors to further illustrate the concept of polynomial expressions.

In another embodiment of the invention, referring to FIG. 2, the grid can be printed on a substrate that can accommodate erasable ink such as an acetate substrate. The students can then outline each respective factor along the columns and rows and color in the resulting cross section. Because the substrate is erasable, a clean grid is obtained by merely cleaning off the previous polynomial representation. Alternatively, the students can be provided with a plurality of transparent colored plastic strips 26 (shown in phantom) having widths equal to widths 14a, 16a and 18a. The students can then, for example, place a desired number of blue transparent strips in appropriate columns of the grid for the first factor and a plurality of yellow plastic strips in appropriate rows for the second factor of the polynomial, and the resulting area of the intersection would appear in green.

While the embodiments disclosed herein are preferred, it will be appreciated from this teaching that various alternatives, modifications, variations or improvements therein may be made by those skilled in the art that are within the scope of the invention, which is defined by the following claims.

What is claimed is:

1. An apparatus for teaching polynomial expressions, comprising:
    means for representing a first column having a first width, representing a first variable of a first factor of a polynomial expression;
    means for representing a second column having a second width different from first width, said and representing a second variable of said first factor;
    means for representing a first row having a first height representing a third variable of a second factor of said polynomial expression; and
    means for representing a second row having a second height different from first height, said and representing a fourth variable of said second factor, wherein the sum of said first variable and said second variable constitutes said first factor and the sum of said third variable and said fourth variable constitutes said second factor.

2. An apparatus according to claim 1, wherein said first width is equal to said first height and said second width is equal to said second height.

3. An apparatus according to claim 2, wherein said first variable and said third variable represents "Y" in said polynomial expression, and said second variable and said fourth variable represents "X" in said polynomial expression.

4. An apparatus according to claim 3, further comprising:
    means for representing a third column having a third width different from said first width and said second width, said third width representing a fifth variable of said first factor; and
    means for representing a third row having a third height, said third height representing a sixth variable of said second factor of said polynomial expression, wherein said third width is equal to said third height.

5. An apparatus according to claim 1, wherein said means for representing said first column and said second column each comprises at least two pegs fixed to a supporting member, and said means for representing said first row and said second row each comprises at least two pegs fixed to said supporting member.

6. An apparatus according to claim 5, wherein said means for representing said first column and said second column and said means for representing said first row and said second row comprises a plurality of pegs fixed to a perimeter of said supporting member.

7. An apparatus according to claim 5, wherein said means for representing said first column and said second column each comprises a plurality of pegs fixed to said supporting member, said pegs being spaced apart along said first and second columns by distances equal to said first height and said second height, and said means for representing said first row and said second row each comprises a plurality of pegs fixed to said supporting member, said pegs being spaced apart along said first and second rows by distances equal to said first width and said second width.

8. An apparatus according to claim 1, wherein said means for representing said first column and said second column and said means for representing said first row and said second row comprises a visual display.

9. An apparatus according to claim 8, wherein said visual display is generated by a computer.

10. An apparatus according to claim 8, wherein said visual display is printed on a substrate.

11. An apparatus according to claim 10, wherein said substrate is made of acetate.

12. A method for teaching polynomial expressions using the apparatus of claim 1, the method comprising the steps of:
    marking a first factor of a polynomial expression along a first direction;
    marking a second factor of said polynomial expression along a second direction substantially perpendicular to said first direction such that the first marking intersects the second marking; and
    determining the area of the intersection of the first marking and the second marking, wherein the area represents the product of said first factor and said second factor.

13. A method according to claim 12, wherein said first factor marking step comprises the step of isolating variables of said first factor by separating at least one column from a plurality of columns, said plurality of columns comprising at least one each of at least a first column having a first width and a second column having a second width, said first width representing a first variable said first factor and said second width representing a second variable of said first factor, and wherein said second factor marking step comprises the step of isolating variables of said second factor by separating at least one row from a plurality of rows, said plurality of rows comprising at least one each of at least a first row having a first height and a second row having a second height, said first height representing a third variable of said second factor and said second height representing a fourth variable of said second factor.

14. A method according to claim 12, wherein said first factor marking step comprises the step of placing at least one of a first plurality of strips along said first direction, a first portion of said plurality of strips having a first width and a second portion of said plurality of strips having a second width different from said first width, said first width representing a first variable of said first factor and said second width representing a second variable of said first factor, and wherein said second factor marking step comprises the step of placing a second plurality of flexible strips along said second direction, a first portion of said second plurality of flexible strips having a first height and a second portion of said second plurality of flexible strips having a second height different from said first height, said first height representing a third variable of said second factor and said second height representing a fourth variable of said second factor.

15. A method according to claim 14, wherein said first strips are made of a transparent material having a first color and said second strips are made of a transparent material having a second color different from said first color, wherein said determining step comprises the step of determining the area of the intersection of the differently colored strips.

16. A method for teaching polynomial expressions using the apparatus of claim 1, the method comprising the steps of:

extending a first elastic member around some of a plurality of pegs fixed to a supporting member, said plurality of pegs defining a plurality of columns, said plurality of columns comprising at least one each of at least a first column having a first width and a second column having a second width, said first width representing a first variable a first factor of a polynomial expression and said second width representing a second variable of said first factor, wherein said first elastic member isolates at least one column representing said first factor;

extending a second elastic member around some of said plurality of pegs, said plurality of pegs further defining a plurality of rows, said plurality of rows comprising at least one each of at least a first row having a first height and a second row having a second height, said first height representing a third variable of a second factor of said polynomial expression and said second height representing a fourth variable of said second factor, wherein said second elastic member isolates at least one row representing said second factor; and determining an area of an intersection of said first elastic member and said second elastic member, wherein said area represents a product of the first and second factors.

17. An apparatus for teaching polynomial expressions, comprising:

means for representing a plurality of columns, said plurality of columns comprising at least one each of at least a first column having a first width and a second column having a second width different from said first width, said first width comprising means for representing a first variable of a first factor of a polynomial expression and said second width comprising means for representing a second variable of said first factor; and means for representing a plurality of rows, said plurality of rows comprising at least one each of at least a first row having a first height and a second row having a second height different from said first height, said first height comprising means for representing a third variable of a second factor of said polynomial expression and said second height comprising means for representing a fourth variable of said second factor, wherein the sum of said first variable and said second variable constitutes said first factor and the sum of said third variable and said fourth variable constitutes said second factor.

18. An apparatus according to claim 17, wherein said means for representing a plurality of columns comprises a first corresponding plurality of flexible strips, said strips having widths equal to said first width and said second width, and wherein said means for representing a plurality of rows comprises a second corresponding plurality of flexible strips different from said first plurality of flexible strips, said second plurality of flexible strips having heights equal to said first height and said second height.

19. An apparatus for teaching polynomial expressions, comprising a plurality of pegs fixed to a support member, said pegs being arranged to define a plurality of columns and a plurality of rows, said plurality of columns comprising at least one each of at least a first column having a first width and a second column having a second width, said first width representing a first variable of a first factor of a polynomial expression and said second width representing a second variable of said first factor, and said plurality of rows comprising at least one each of at least a first row having a first height and a second row having a second height, said first height representing a third variable of a second factor of said polynomial expression and said second height representing a fourth variable of said second factor, wherein the sum of said first variable and said second variable constitutes said first factor and the sum of said third variable and said fourth variable constitutes said second factor.

20. A method for teaching polynomial expressions comprising the steps of:

marking a first factor of a polynomial expression along a first direction;

marking a second factor of said polynomial expression along a second direction substantially perpendicular to said first direction such that the first marking intersects the second marking; and determining the area of the intersection of the first marking and the second marking, wherein the area represents the product of said first factor and said second factor.

21. A method according to claim 20, wherein said first factor marking step comprises the step of isolating variables of said first factor by separating at least one column from a plurality of columns, said plurality of columns comprising at least one each of at least a first column having a first width and a second column having a second width, said first width representing a first variable of said first factor and said second width representing a second variable of said first factor, and wherein said second factor marking step comprises the step of isolating variables of said second factor by separating at least one row from a plurality of rows, said plurality of rows comprising at least one each of at least a first row having a first height and a second row having a second height, said first height representing a third variable of said second factor and said second height representing a fourth variable of said second factor.

* * * * *